(12) United States Patent
Nair et al.

(10) Patent No.: US 8,309,005 B2
(45) Date of Patent: Nov. 13, 2012

(54) METHOD OF MAKING A CUSTOMIZED PACKAGING FILM FOR A PHARMACEUTICAL PRODUCT

(75) Inventors: Ajith Sashidharan Nair, Pune (IN); Praful R. Naik, Pune (IN)

(73) Assignee: Bilcare Limited, Pune (IN)

( * ) Notice: Subject to any disclaimer, the term of this patent is extended or adjusted under 35 U.S.C. 154(b) by 1034 days.

(21) Appl. No.: 11/131,144

(22) Filed: May 17, 2005

(65) Prior Publication Data
US 2006/0201602 A1   Sep. 14, 2006

(30) Foreign Application Priority Data
Mar. 10, 2005   (IN) ............................ 262/MUM/2005

(51) Int. Cl.
*B32B 37/00* (2006.01)
*B29C 45/76* (2006.01)
*B29C 47/06* (2006.01)

(52) U.S. Cl. ............... 264/171.1; 264/40.1; 264/173.16; 264/176.1

(58) Field of Classification Search ................ 264/171.1
See application file for complete search history.

(56) References Cited

U.S. PATENT DOCUMENTS
2005/0186376 A1 * 8/2005 Rhee et al. ................... 428/36.9

OTHER PUBLICATIONS

Allinson et al., The Effects of Packaging on the Stability of a Moisture Sensitive Compound, International Journal of Pharmaceutics, 221 (2001) 49-56.*

* cited by examiner

*Primary Examiner* — Jeffrey Wollschlager
(74) *Attorney, Agent, or Firm* — Lucas & Mercanti, LLP

(57) ABSTRACT

A method of making a customized packaging film for a pharmaceutical product is disclosed. The method is based on a packaging requirement needs for a particular product at various climatic conditions based on the various properties of a group of packaging materials. The method involves evaluating the sensitivity of a pharmaceutical product towards various environment factors and inherent factors, quantification of the sensitivity parameters, determining the threshold values of the sensitivity parameters for a pre defined shelf life; determining threshold values of barrier properties of various packaging materials, determining physical properties of packaging material and selecting a packaging material and its thickness which matches the product requirement.

3 Claims, No Drawings

METHOD OF MAKING A CUSTOMIZED PACKAGING FILM FOR A PHARMACEUTICAL PRODUCT

This application is based on the priority of Indian patent application Serial No. 262/MUM/2005 filed Mar. 10, 2005.

This invention relates to a method of making a customized packaging film for a pharmaceutical product.

Presently the packaging films available for healthcare products are generic in nature. The closest option/s from the available stock of packaging materials is selected and used by applying trial and error method. This sometimes causes over packaging and under packaging and effects cost and quality of the final product. There is no method of selecting an optimum packaging film designed for the product, particularly a pharmaceutical product to be packed.

The efficacy of the packaging film selected is tested by prolonged stability under typical conditions, which do not necessarily represent the actual climatic conditions where the product may be distributed. Even if the stability condition represents realistic conditions, this procedure can ensure only the suitability of the packaging and safety of the medicine/s, but there is no means of determining whether the protection levels are optimum. The most unfortunate part is at the end of the stability studies if one finds that the product is not stable in the studied pack. Then the entire exercise has to be repeated all over again by (either) changing the packaging materials (dimensions of the film or increasing the number of layers). Sometimes, defects in the film are not revealed until much later and entire batches of pharmaceutical products may have to be withdrawn because of inadequate packaging. The tendency is there fore to over-design the film. This is waste of material resources and also proves costly in the long run.

In the prior art, still there is no procedure available to understand the packaging requirement of a pharmaceutical product and a method of developing a customized film provides optimum protection for the product. The procedure outlines the process of developing customized packaging film, which can protect the product optimally by understanding the realistic packaging needs of the product quantitatively.

The present invention there fore relates to a method for making a customized packaging film for any healthcare products. The method of this invention is based on a process of quantitative determination of packaging requirement_ (needs) for a particular product at various climatic conditions and the various properties of a group of packaging materials.

According to this invention there is provided a method of making a packaging film for a pharmaceutical product comprising the steps of:

[a] Evaluating the sensitivity of the pharmaceutical product towards the following environment factors:
 [i] humidity,
 [ii] light,
 [iii] temperature,
 [iv] gases,
[b] Evaluating the sensitivity of the pharmaceutical product towards the following inherent factors:
 [i] gas liberation tendency
 [ii] drug release pattern;
 [iii] dimension;
 [iv] hygroscopicity;
 [v] degradation tendency; and
 [vi] dehydration,
to obtain the sensitivity parameters corresponding to the aforesaid environment factors and the aforesaid inherent factors

[c] quantification of the sensitivity parameters so obtained;
[d] determining the threshold values of the sensitivity parameters from which the said pharmaceutical product should be protected for a predefined shelf life;
[e] determining, based on the aforesaid threshold values; the barrier properties of a group of packaging material including polymers, papers and metal with reference to their respective thicknesses suitable for packaging the said pharmaceutical product in a film having at least one layer, said barrier properties being
 [i] water vapour transmission rate;
 [ii] gas transmission rate;
 [iii] percentage light transmittance;
 [iv] thermal conductivity;
[f] determining the physical properties of the said packaging material based on its
 [i] tensile strength;
 [ii] dart impact strength;
 [iii] thermoformability;
 [iv] sealing strength
 [v] elongation;
 [vi] surface tension;
 [vii] softening temperature;
 [viii] residual monomer content;
 [ix] migration;
 [x] gloss;
 [xi] thermal stability;
 [xii] flexibility;
 [xiii] machineability;
 [xiv] non toxicity;
 [xv] printability;
[g] selecting at least one packaging material and its thickness whose barrier properties and physical properties satisfy all the determined threshold values of the sensitivity parameters of the pharmaceutical product;
[h] Developing packaging film/ subsrate by integrating the materials in to one consisting of at least one layer.

The packaging film may have 1 to 25 layers of same material of same thickness or of the same material of different thicknesses or of different materials of same thickness or different thickness.

The step of evaluating the drug release pattern of the pharmaceutical product may include evaluating its disintegration time and percentage dissolution. Disintegration Time is the time required for a tablet to break up into granules of specified size (or smaller), under carefully specified test conditions. The conditions of the laboratory test, in vitro, are set to simulate those that occur in vivo. Factors such as the kind and amount of tablet binders and the degree of compression used in compacting the tablet ingredients help determine disintegration time. The active ingredients in a disintegrated tablet are not necessarily found to be in solution and available for absorption. A long disintegration time is incompatible with rapid drug absorption; a short disintegration time, by itself, does not ensure rapid absorption.

The step of evaluating the dimension preferably includes the step of evaluating the size and shape of the product.

The step of evaluating the hygroscopicity includes the step of evaluating its equilibrium moisture and its rate of moisture absorption, and pattern of moisture absorption. Hygroscopicity is the ability of a substance to absorb moisture.

The step of evaluating the degradation includes physical as well as chemical degradation of the product.

The step evaluating the dehydration tendency of the product includes step of evaluating loss of moisture present in the drug.

The layers are made by a conventional process selected from the following processes: Calendaring, Blown extrusion, Extrusion coating, Dry & Wet Lamination, Gravure coating, Air knife coating, Co-extrusion, vacuum deposition and Sputtering. Knife coating techniques are especially suitable for relatively thin coatings of materials such as adhesives. A high pressure jet of air along with a metered quantity of material is forced through orifices in the knife to control the thickness of the material coating. In vacuum deposition, thin material coatings are condensed on relatively cool surfaces in a vacuum. In sputtering which is a modified deposition process, material from a cathode or target is removed and deposited on an adjacent substrate. Gravure coating technique is a technique which is water and solvent based. This is particularly suitable for thin coatings <15 microns on substrates at high speeds >30 m/s. Another coating technique is reverse gravure roll coating. In calendaring, a calendaring roller is used to apply a thin film. In the process of co extrusion on the other hand, two or more materials one the substrate and the other the coasting film, are extruded through a single die with two or more orifices arranged so that the extrudates meet and weld together into a laminar structure before chilling. All these techniques are well known in the art.

The group of material selected for making the packaging film include Poly vinyl chloride, Polyvinylidine chloride, Polypropylene, Cyclic olefin copolymer, Aluminium, Paper, Polyester, Polyethylene Nitrile, Low Density Poly Ethylene, High Density Poly Ethylene, glycolized polyester [PETG], Amorphous polyethyle terepthalate [APET], Biaxial Oriented Poly Propylene, Nylon, Polyviscose, Poly Vinyl Acetate; Ethylene vinyl acetate [EVA], Acrylic, Textile fibrous material, Poly Acro Nitrile, Poly Ethelene Terepthalate, PCTFE (Poly Chloro Tri Flouro Ethylene), Co polyol polymer [CPP], Cellophane, Polycarbonate, liner low density poly ethylene [LLDPE] and Polyvinyl alcohol.

The thickness of the film may range from 2 to 1000 microns.

The water vapour transmission rate of the film may range from 100 to 0 gm/m2/day. The water vapour transmission rate [WVTR] is the steady state rate at which water permeates through a film at specified conditions of temperature and relative humidity.

The gas transmission rate of the film may range from 5000 to 0 gm/m2/day. Typically, the gas is oxygen and the oxygen transmission rate of the film ranges from 1000 to 0 gm/m2/day. The gas transmission rate is the rate at which a given gas will diffuse through a stated area of the film at standard pressure and temperature.

The transparency may range from 0 to 100 percent.

The thermal conductivity may range from low to high. The thermal conductivity is the measure of the ability of a material to conduct heat. For a composite material such as a film, it is the item rate of flow, under steady conditions through unit area, per unit temperature gradient in the direction perpendicular to the area.

The tensile strength may range from 100-1000 Kg/cm2. The tensile strength is the maximum load that the film can support without fracture when being stretched, divided by the original cross sectional area of the material.

The dart impact strength may range from 50 to 1 000 grams. Many materials are sensitive to the presence of flaws, cracks and notches and they fail suddenly under impact. Impact strength is the ability of the material to withstand impact. The dart impact strength is typically related to films. A dart is made of the film and the impact strength of the dart is evaluated by shock loading.

The thermoformability may range from 25 to 200 degrees Celsius. Is a measure of the plasticity of the material. It is the ability of a material to be formed typically into a thin film and is generally indicated by a temperature.

The sealing strength may range from 0.1 to 2.0 kg/cm. The sealing strength is the strength required for de-sealing two sheets of the film sealed together.

The elongation of the material typically includes evaluating its peak elongation and the peak elongation may be between 1 to 50 %. Further, evaluating the elongation of the material includes evaluating its break elongation ranging between 2 to 100 %. Elongation is the measure of the elasticity of the material. It is measured as a percentage of the original. Thus 20 per cent elongation would mean that the film can be elongated by 20 per cent without deformation. The break elongation however is a measure of the elongation that a material can withstand until it breaks.

The surface tension may be 10 to 70 dynes/cm. It is property of a liquid or thin film acting as if it was a stretched elastic membrane. The molecules in the film are attracted to each other.

The softening temperature may be between 20 to 150 degrees Celsius. It is the temperature at which the material will soften to a slump under its own weight.

The residual monomer content may range from 0 to 100 ppm. The residual monomer content is the unpolymerized monomer that remains incorporated in a polymer after the polymerisation reaction is complete.

The migration may range between 0 to 10000 ppm. Migration is the transfer of a constituent usually harmful, of a plastic compound to another contacting substance for instance a plasticizer.

The gloss at 60 degrees Celsius may range between 0 to 1000 per cent.

The thermal stability may range between −30 to 200 degrees Celsius.

The process of developing the customized film in accordance with this invention has the following major steps:
1. Quantitative Evaluation of Environmental Sensitivity of the Product
   This involves quantifying the sensitivity of product against three environmental variables- Humidity (Moisture), Temperature, and Light intensity by studying the influence of these environmental factors of stability parameters of the product.
2. Deriving the Required Optimum Film Properties
   Based on the environmental sensitivity of the product, its protection requirement against each environmental factors are determined quantitatively and corresponding functional properties of the film is derived by mathematical simulation program; and
3. Development of Multi Layered Film Having the Requisite Properties.
   Based on the understanding of the properties of various available materials, material type and the required thicknesses which provide the required properties the composite film is determined. The composite film is produced using suitable processes.

The invention will now be described with reference to the accompanying examples:

EXAMPLE 1

Development of Optimum Packaging Film for a Moisture Sensitive Hydrocortisone Soft Gelatine Capsule a. Evaluation of the Sensitivity of the Product Towards the Environmental Factors:

The product is exposed various environmental conditions and studied its sensitivity towards each factor and derived its sensitivity values.

1. Sensitivity Study Towards Humidity.

The product is exposed to various humidities varying from 10% RH to 90% RH at interval of 15% RH and its physical and chemical changes are obtained were quantitatively analysed to derive its sensitivity by using the developed logic.

2. Sensitivity Towards Temperature

The product is exposed to various temperatures varying from −20 to 55° C. at 15° C. interval and physico-chemical changes were studied and temperature sensitivity has derived.

3. Sensitivity Towards Light

The product is exposed to UV (up to 500 W-Hr/m2) and 1.5 Million Lux Hrs at regular interval and the physio-chemical changes were studied 4. Sensitivity Towards Oxygen The product is exposed to in an oxygen chamber and the pressure variance is studied to quantify the oxygen consumption. The physico chemical changes were studied during this process to derive its sensitivity

|   | Environmental factor | Sensitivity |
|---|---|---|
| 1 | Humidity | 4.8 |
| 2 | Temperature | 7.5 |
| 3 | UV light | 3.5 |
| 4 | Visible Light | 1.0 |
| 5 | Oxygen | 1.0 | b. Evaluation and Quantification of Sensitivity Related to Inherent Properties

The following inherent properties of the product studied in various climatic conditions and sensitivity is derived based extent of changes happened on these properties

|   | Inherent property | Sensitivity scale |
|---|---|---|
| 1 | Hygroscopicity | 5.63 |
| 2 | Degradation tendency | 7.60 |
| 3 | Drug release property | 1.5 |
| 4 | Gas liberation tendency | 0.00 |
| 5 | Dimensional | 4.8 | c. Threshold Values of the Sensitivity Parameters from Which the Product Should be Protected for a Predefined Shelf Life:

| | | Threshold Values | | |
|---|---|---|---|---|
| Sr. No. | Climatic Condition | Moisture % (w/w) | Temperature | Gas (cc) | Light |
| | Cold climatic Zones (Climatic zone 1 & 2) | 1.12 | 30° C. max. | Not applicable | Medium |

The critical parameter of the product is moisture and temperature.

d. Determination of the Barrier Requirement of the Package:

| Sr. No. | Condition | Threshold Value | Time period | Max. WVTR of the package |
|---|---|---|---|---|
| 1 | Cold climatic Zones (Climatic zone 1 & 2) | 1.12 | 17 months | 0.00077 |

Gas Barrier Requirement:
As the product is not sensitive to gases, this is not applicable.
Light Barrier Requirement:

| Sr. No. | Condition | Sensitivity to UV light | Sensitivity towards Vis Light | Time period | % Transmission |
|---|---|---|---|---|---|
| 1 | Cold climatic Zones (Climatic zone 1 & 2) | Medium | Low | 17 months | 60% max. |

Temperature Barrier Requirement:
The package material should be a bad conductor of heat e. Barrier Requirement for the Packaging

| Sr. No. | Barrier property | Limit |
|---|---|---|
| 1 | WVTR | 0.00016 max. |
| 2 | OTR | Not applicable |
| 3 | Light transmission | 60% max. |
| 4 | Temperature barrier | Should be very poor heat conductor. | f. Determination of Packaging Mode

Based on the machine availability and convenience and productivity, packaging mode selected is Blister packaging.

g. Determination of Packaging Material

Material form: Film because packaging mode is blister packaging

Functional Properties

| SR NO | PROPERTIES | UNIT | |
|---|---|---|---|
| 1 | WVTR @ 90% Rh, 38° C. | gm/m2/24 hr. | 0.45 |
| 2 | Light Transmission | % | 50 max. |
| 3 | Gas transmission | cc/m2/24 hr./bar | Not specific |
| 4 | Thermal conductivity | Heat conducitviity | Poor |

Application Properties

| SR NO | PROPERTIES | UNIT | Specification |
|---|---|---|---|
| 1 | Thickness | microns | 200-400 |
| 1 | Dimensional Stability: | | |
| | Longitudinal (Shrinkage) | % | −7.00 max. |
| | Transversal (Stretching) | % | +2 max. |
| 2 | Impact Strength | gm | 350 min |
| 3 | Tensile Strength: | kg/cm | |
| | Longitudinal | | 400 min |
| | Transverse | | 400 min. |

-continued

| SR NO | PROPERTIES | UNIT | Specification |
|---|---|---|---|
| 4 | Elongation at Peak Load<br>Longitudinal<br>Transverse | % | <br>4.0 min.<br>4.0 min. |
| 5 | Heat seal strength with Aluminium Foil | kg/cm | 0.30 min. |
| 11 | Forming Temperature | ° C. | 100-170 |
| 12 | Toxicity |  | Non Toxic |
| 13 | Stretchability |  | 20% | h. Material Selection for Getting the Required Property

Material which satisfies the functional and performance requirement in film form of the specified thickness condition is selected from polymer data bank.

The polymers PVdC, in thicknesses of 35 microns and PCTFE 23 microns, COC in 140 microns satisfy the barrier properties.

Application properties are satisfied by PVC above 250 microns except the stretchability which is satisfied by LDPE or PP in 25 to 30 microns.

i. Selection of Technically Feasible Material Composition

Since no single polymer satisfies all the properties, combination of film needs to be selected. Based on combination properties.

PVC/PE/PVdC, PVC/PE/PCTFE and PP/COC/PP with total thicknesses in the range of 200 to 400 microns.

j. Finalization of the Material Composition Based Commercial Aspect

Cost evaluation is done with all these films and PVC/PE/PVdC composition is found to be the most economical and hence is selected.

k. Manufacturing of the Optimum Packaging Material
1. Calendaring of rigid, non toxic food & pharmaceutical grade PVC resin to a film of 300 microns
2. Extrusion blown of non-toxic LDPE resin to get 30 microns film.
3. Dry Lamination of 30 micron LDPE film to 300 micron PVC film to get 330 micron thermoforming laminated film.
4. PVdC dispersion is coated on to the 366 microns by using air knife coating method to 366 microns PVC/PE/PVdC film.

EXAMPLE 2

Development of Optimum Packaging Film for Rantidine Tablet a. Evaluation of the Sensitivity of the Product Towards the Environmental Factors:

The product is exposed various environmental conditions and studied its sensitivity towards each factor and derived its sensitivity values.

a. Sensitivity Study Towards Humidity.

The product is exposed to various humidities varying from 10% RH to 100% RH at interval of 15% RH and its physical and chemical changes are obtained were quantitatively analyzed to derive its sensitivity by using the developed logic.

b. Sensitivity Towards Temperature

The product is exposed to various temperatures varying from 5° C. to 55° C. at 15° C. interval and physico-chemical changes were studied and temperature sensitivity has derived.

c. Sensitivity Towards Light

The product is exposed to UV (up to 700 W-Hr/m2) and 3.0 Million Lux Hrs at regular interval and the physiochemical changes were studied d. Sensitivity Towards Oxygen The product is exposed to in an oxygen chamber and the pressure variance is studied to quantify the oxygen consumption. The physicochemical changes were studied during this process to derive its sensitivity

|   | Environmental factor | Sensitivity |
|---|---|---|
| 1 | Humidity | 10 |
| 2 | Temperature | 5.6 |
| 3 | UV light | 2.3 |
| 4 | Visible Light | 2.0 |
| 5 | Oxygen | 1.0 | b. Evaluation and Quantification of Sensitivity Related to Inherent Properties

The following inherent properties of the product studied in various climatic conditions and sensitivity is derived based extent of changes happened on these properties

|   | Inherent property | Sensitivity |
|---|---|---|
| 1 | Hygroscopicity | 9.5 |
| 2 | Degradation tendency | 7.30 |
| 3 | Drug release property | 1.00 |
| 4 | Gas liberation tendency | 0.00 |
| 5 | Dimensional | 4.45 | c. Threshold Values of the Sensitivity Parameters from Which the Product Should be Protected for a Predefined Shelf Life:

| Sr. No. | Climatic Condition | Threshold Values ||||
|---|---|---|---|---|---|
|  |  | Moisture % (w/w) | Temperature | Gas (cc) | Light |
| | Cold climatic Zones (Climatic zone 1 & 2) | 3.34 | 45° C. max. | Not significant | Not significant | d. Determination of the Barrier Requirement of the Package:
Barrier Requirement:

| Sr. No. | Condition | Threshold Value | Time period | Max. WVTR of the package |
|---|---|---|---|---|
| 1 | Tropical Condition | 3.34 | 12 months | 0.00008 |

Gas Barrier Requirement:

As the product is not sensitive to gases, this property is not required

Light Barrier Requirement:

| Sr. No. | Condition | Sensitivity to UV light | Sensitivity towards Vis Light | Time period | % Transmission |
|---|---|---|---|---|---|
| 1 | Tropical climatic condition | Low | Low | 12 months | No specific restriction |

Temperature Barrier Requirement:
The product should heated to temperature above 45° C.

e. Barrier Requirement for the Packaging

The product is sensitive to temperature and moisture only.

| Sr. No. | Parameter | Limit |
|---|---|---|
| 1 | WVTR | 0.00007 max. |
| 2 | Temperature | 45° C. max. | f. Determination of Packaging Mode

Since the product is in tablet form, blister packaging and strip packaging are suitable for the product. But due to productivity and convenience advantages, packaging mode selected is Blister packaging.

g. Determination of Packaging Material

Material form: Film because packaging mode is blister packaging

Functional Properties

| SR NO | PROPERTIES | UNIT | |
|---|---|---|---|
| 1 | WVTR @ 90% Rh, 38° C. | gm/m2/24 hr. | 0.07 |
| 2 | OTR | cc/m2/24 hr. bar | No specific limits |
| 2 | Transparency | % | No specific limits |
| 3 | Thermal conductivity | Conductivity | Should not be good heat conductor |

Application Properties

| SR NO | PROPERTIES | UNIT | |
|---|---|---|---|
| 1 | Impact Strength | gm | 350 min |
| 2 | Tensile Strength: | kg/cm | |
| | Longitudinal | | 400 min |
| | Transverse | | 400 min. |
| 3 | Elongation at Peak Load | % | |
| | Longitudinal | | 4.6 min. |
| | Transverse | | 4.8 min. |
| 4 | Toxicity | | Non Toxic |
| 5 | Stretchability | | 10% |
| 6 | Sealability | | Good |
| 7 | Residual monomer content | ppm | 1 max. | h. Material Selection for Getting the Required Property

Material, which satisfies the requirement in film form of the specified thickness condition, is selected from material data bank.

The polymers PCTFE of 75 microns and aluminum foil of 45 microns satisfies the functional properties respectively PVC, PP, Nylon satisfies application properties.

i. Selection of Technically Feasible Material Composition

Since no single polymer satisfies all the properties, combination of film needs to be selected. Based on combination properties.

PVC/PCTFE OR PVC/ALUMNIUM/NYLON found to be suitable among the lot which satisfies all the requirements.

i. Finalization of the Material Composition Based Commercial Aspect

PVC/Aluminium/Nylon composite is found to be the most economical among the lot and is selected.

k. Manufacturing of the Optimum Packaging Material
1. Calendaring of rigid, non-toxic, PVC resin to create a film of 60 micron.
2. Laminate 45 microns Alumnium foil to PVC using solvent less adhesive system.
3. Laminate 25 microns Nylon film to the above composite using two-component adhesive system.
4. Slit the film in to small spools.
5. Fill the product in the cavity formed in the film by cold forming process and seal with 25 microns hard tempered aluminum foil.

EXAMPLE 3

Development of Optimum Packaging Film for Vitamin E Hard Gelatine Capsule a. Evaluation of the Sensitivity of the Product Towards the Environmental Factors:

The product is exposed various environmental conditions and studied its sensitivity towards each factor and derived its sensitivity values.

a. Sensitivity Study Towards Humidity.

The product is exposed to various humidities varying from 10% RH to 90% RH at interval of 15% RH and its physical and chemical changes are obtained were quantitatively analysed to derive its sensitivity by using the developed logic.

b. Sensitivity Towards Temperature

The product is exposed to various temperatures varying from 0 to 60° C. at 15° C. interval and physico-chemical changes were studied and temperature sensitivity has derived.

c. Sensitivity Towards Light

The product is exposed to UV (up to 700 W-Hr/m2) and 3.0 Million Lux Hrs at regular interval and the phsycochemcial changes were studied d. Sensitivity Towards Oxygen The product is exposed to in an oxygen chamber and the pressure variance is studied to quantify the oxygen consumption. The physico chemical changes were studied during this process to derive its sensitivity

| | Environmental factor | Sensitivity |
|---|---|---|
| 1 | Humidity | 2.5 |
| 2 | Temperature | 3.7 |
| 3 | UV light | 6.6 |
| 4 | Visible Light | 5.8 |
| 5 | Oxygen | 0.0 | b. Evaluation and Quantification of Sensitivity Related to Inherent Properties

The following inherent properties of the product studied in various climatic conditions and sensitivity is derived based extent of changes happened on these properties

| | Inherent property | Sensitivity scale |
|---|---|---|
| 1 | Hygroscopicity | 2.33 |
| 2 | Degradation tendency | 3.7 |
| 3 | Drug release property | 3.6 |
| 4 | Gas liberation tendency | 0.00 |
| 5 | Dimensional | 5.43 | c. Threshold Values of the Sensitivity Parameters from Which the Product Should be Protected for a Predefined Shelf Life:

| Sr. No. | Climatic Condition | Threshold Values | | | |
|---|---|---|---|---|---|
| | | Moisture % (w/w) | Temperature | Gas (cc) | Light |
| | Cold climatic Zones (Climatic zone 1 & 2) | 10.4 | 45° C. max. | 1.2 | 0.5 Mn. L × hrs & 50 W − Hr/m2 | d. Determination of the Barrier Requirement of the Package:

Moisture Barrier Requirement:

| Sr. No. | Condition | Threshold Value | Time period | Max. WVTR of the package |
|---|---|---|---|---|
| 1 | Tropical Climatic (Zone 4) | 10.0 | 2 years | 0.0020 |

Gas Barrier Requirement:

| Sr. No. | Condition | Threshold Value | Time period | Max. OTR the package |
|---|---|---|---|---|
| 1 | Tropical Climatic (Zone 4) | 1.2 | 2 years | 0.0020 |

Light Barrier Requirement:

| Sr. No. | Condition | Sensitivity to UV light | Sensitivity towards Vis Light | Time period | % Transmission |
|---|---|---|---|---|---|
| 1 | Tropical climatic zone | High | Medium | 2 years | 5% Max |

Temperature: 45° C. max.

e. Barrier Requirement for the Packaging

| Sr. No. | Parameter | Limit |
|---|---|---|
| 1 | WVTR | 0.0019 max. |
| 2 | OTR | 0.014 max. |
| 3 | Light transmission | 5% max. |
| 4 | Temperature | 40° C. max. | f. Determination of Packaging Mode

Based on the machine availability and convenience and productivity, packaging mode selected is Blister packaging.

g. Determination of Packaging Material

Material form: Film because packaging mode is blister packaging

Thickness requirement : 200 to 250 microns

Colour: Dark Amber or opaque

Functional Properties

| SR NO | PROPERTIES | UNIT | |
|---|---|---|---|
| 10 | WVTR @ 90% Rh, 38° C. | gm/m2/24 hr. | 3.48 |
| 11 | OTR | Cc/m2/2 hr./bar | 54.0 |
| 12 | Light Transmission | % | 5 |
| 13 | Thermal conductivity | | Poor |

Application Properties

| SR NO | PROPERTIES | UNIT | |
|---|---|---|---|
| 1 | Dimensional Stability: | | |
| | Longitudinal (Shrinkage) | % | −4.00 max. |
| | Transversal (Stretching) | % | +2 max. |
| 2 | Impact Strength | gm | 350 min |
| 3 | Tensile Strength: | kg/cm | |
| | Longitudinal | | 440 min |
| | Transverse | | 450 min. |
| 4 | Elongation at Peak Load | % | |
| | Longitudinal | | 4 min. |
| | Transverse | | 4 min. |
| 5 | Heat seal strength with Aluminium Foil | kg/cm | 0.3 min. |
| 11 | Forming Temperature | ° C. | 100-130 |
| 12 | Toxicity | | Non Toxic |
| 13 | Stretchability | | 20% |
| 14 | Migration | ppm | 60 max. | h. Material Selection for Getting the Required Property

Material which satisfies the requirement in film form of the specified thickness condition is selected from polymer data bank.

The polymers PVC, PP, APET with Dark amber and white opaque colour satisfy all the requirements i. Selection of Technically Feasible Material Composition All these materials with 250-300 microns thick film form is suitable for this product i. Finalization of the Material Composition Based Commercial Aspect Based on the cost evaluation, White opaque APET film in 250 microns is found to be the most optimum packaging for the product k. Manufacturing of the Optimum Packaging Material 1. APET film is thermoformed at 150° C. in flat bed blister forming machine
2. Products are filled in the cavites.
3. Cavities are sealed with 20 micron Heat seal lacquer coated Aluminium foil.

EXAMPLE 4

Development of Optimum Packaging for Himsra Herbal Product a. Evaluation of the Sensitivity of the Product Towards the Environmental Factors:

The product is exposed various environmental conditions and studied its sensitivity towards each factor and derived its sensitivity values.

a. Sensitivity Study Towards Humidity.

The product is exposed to various humidities varying from 10% RH to 90% RH at interval of 15% RH and its physical and chemical changes are obtained were quantitatively analysed to derive its sensitivity by using the developed logic.

b. Sensitivity Towards Temperature

The product is exposed to various temperatures varying from 15° C. to 60° C. at 15° C. interval and physico-chemical changes were studied and temperature sensitivity has derived.

c. Sensitivity Towards light

The product is exposed to UV (up to 500 W-Hr/m2) and 1.5 Million Lux Hrs at regular interval and the physicochemical changes were studied d. Sensitivity Towards Oxygen The product is exposed to in an oxygen chamber and the pressure variance is studied to quantify the oxygen consumption. The physico chemical changes were studied during this process to derive its sensitivity

|   | Environmental factor | Sensitivity |
|---|---|---|
| 1 | Humidity | 3.5 |
| 2 | Temperature | 3.8 |
| 3 | UV light | 4.5 |
| 4 | Visible Light | 2.0 |
| 5 | Oxygen | 1.0 | b. Evaluation and Quantification of Sensitivity Related to Inherent Properties

The following inherent properties of the product studied in various climatic conditions and sensitivity is derived based extent of changes happened on these properties

|   | Inherent property | Sensitivity scale |
|---|---|---|
| 1 | Hygroscopicity | 5.6 |
| 2 | Degradation tendency | 4.5 |
| 3 | Drug release property | 0.5 |
| 4 | Gas liberation tendency | 5.0 |
| 5 | Dimensional | Not applicable | c. Threshold Values of the Sensitivity Parameters from Which the Product Should be Protected for a Predefined Shelf Life:

| | | Threshold Values | | |
|---|---|---|---|---|
| Sr. No. | Climatic Condition | Moisture % (w/w) | Temperature | Gas (cc) | Light |
| | Tropical climatic Zone | 4.41 | 45° C. max. | Gas liberating | Not significant | d. Determination of the Barrier Requirement of the Package:
Moisture Barrier Requirement:

| Sr. No. | Condition | Threshold Value | Time period | Max. WVTR of the package |
|---|---|---|---|---|
| 1 | Tropical Accelerated Condition | 4.41 | 18 months | 0.0051 |

Gas Barrier Requirement:

| Sr. No. | Condition | Threshold Value | Time period Specified | Max. OTR of the package |
|---|---|---|---|---|
| 1 | Tropical zones | Gas liberating | 18 months | 0.1 min. |

Light Barrier Requirement:

| Sr. No. | Condition | Sensitivity to UV light | Sensitivity towards Vis Light | Time period | % Transmission |
|---|---|---|---|---|---|
| 1 | Tropical Accelerated Condition | Low | Low | 18 months | No specific limit |

Temperature: 50° C. max.

e. Barrier Requirement for the Packaging

| Sr. No. | | |
|---|---|---|
| 1 | WVTR | 0.0051 max. |
| 2 | GTR | 0.1 Min. |
| 3 | Light transmission | No limit. |
| 4 | Temperature | 45° C. max. | f. Determination of Packaging Mode

As the product is powdery in form, and with the machine availability, pouch packaging is recommended.

g. Determination of Packaging Material

Material form: Film because packaging mode is Pouch packaging

Functional Properties

| SR NO | PROPERTIES | UNIT | Specification |
|---|---|---|---|
| 10 | WVTR @ 90% Rh, 38° C. | gm/m2/24 hr. | 7.5 max. |
| 11 | GTR | cc/m2/2 hr./bar | 20 min. |
| 12 | Transparency | % | No limit |
| 13 | Thermal conductivity | | Should no be high |

Application Properties

| SR NO | PROPERTIES | UNIT | |
|---|---|---|---|
| 1 | Thickness | microns | 20-30 |
| 2 | Tensile Strength: Longitudinal Transverse | kg/cm | 400 min 400 min. |
| 3 | Self sealing strength | kg/cm | 0.30 min. |
| 4 | Toxicity | | Non Toxic |
| 5 | Special requirement | | Halogen free | h. Material Selection for Getting the Required Property

Material, which satisfies the requirement in film form of the specified thickness condition, is selected from material data bank.

The polymers BOPP, PP, PVC, PCTFE, APET all satisfy the functional properties.

BOPP, and PP satisfy application properties.

i. Selection of Technically Feasible Material Composition
  BOPP or PP film of thickness 25 microns is suitable options
j. Finalization of the Material Composition
  On superior aesthetic properties BOPP film been selected for pouch packaging
k. Manufacturing of the Optimum Packaging
  a. BOPP films are slitted in to spools of pouch width
  b. BOPP pouches are made by sealing the three sides in pouch making machines.
  c. The product is filled in the pouch in a filling machine
  d. The fourth side is heat sealed to make the final pack.

EXAMPLE 5

Development of Optimum Packaging Film for Ampicillin Gas Liberating Product a. Evaluation of the Sensitivity of the Product Towards the Environmental Factors:
  The product is exposed various environmental conditions and studied its sensitivity towards each factor and derived its sensitivity values.
a. Sensitivity Study Towards Humidity.
  The product is exposed to various humidities varying from 10% RH to 90% RH at interval of 15% RH and its physical and chemical changes are obtained were quantitatively analyzed to derive its sensitivity by using the developed logic.
b. Sensitivity Towards Temperature
  The product is exposed to various temperatures varying from −20 to 55° C. at 15° C. interval and physico-chemical changes were studied and temperature sensitivity has derived.
c. Sensitivity Towards Light
  The product is exposed to UV (up to 500 W-Hr/m2) and 1.5 Million Lux Hrs at regular interval and the physiochemical changes were studied
d. Sensitivity Towards Oxygen
  The product is exposed to in an oxygen chamber and the pressure variance is studied to quantify the oxygen consumption. The physicochemical changes were studied during this process to derive its sensitivity

|   | Environmental factor | Sensitivity |
|---|---|---|
| 1 | Humidity | 6.5 |
| 2 | Temperature | 4.6 |
| 3 | UV light | 0.5 |
| 4 | Visible Light | 0.5 |
| 5 | Oxygen | 1.0 | b. Evaluation and Quantification of Sensitivity Related to Inherent Properties
  The following inherent properties of the product studied in various climatic conditions and sensitivity is derived based extent of changes happened on these properties.

|   | Inherent property | Sensitivity |
|---|---|---|
| 1 | Hygroscopicity | 4.0 |
| 2 | Degradation tendency | 4.67 |
| 3 | Drug release property | 1.75 |
| 4 | Gas liberation tendency | 6.75 |
| 5 | Dimensional | 2.23 | c. Threshold Values of the Sensitivity Parameters from Which the Product Should be Protected for a Predefined Shelf Life:

| | | Threshold Values | | |
|---|---|---|---|---|
| Sr. No. | Climatic Condition | Moisture % (w/w) | Temperature | Gas (cc) | Light |
| 1 | Tropical climatic Zone | 3.34 | 45° C. max. | Gas liberating | Not significant | d. Determination of the Barrier Requirement of the Package:
  Barrier Requirement:

| Sr. No. | Condition | Threshold Value | Time period | Max. WVTR of the package |
|---|---|---|---|---|
| 1 | Tropical Climatic Condition | 3.34 | 24 months | 0.008 |

Gas Barrier Requirement:

| Sr. No. | Condition | Threshold Value | Time period Specified | Max. GTR of the package |
|---|---|---|---|---|
| 1 | Tropical Zone Condition | Gas liberating | 24 months | 5.0 min. |

Light Barrier Requirement:

| Sr. No. | Condition | Sensitivity to UV light | Sensitivity towards Vis Light | Time period | % Transmission |
|---|---|---|---|---|---|
| 1 | Tropical Zone Condition | Low | Low | 24 months | No specific requirement |

Temperature: 40° C. max.
e. Barrier Requirement for the Packaging

| Sr. No. | Parameter | Limit |
|---|---|---|
| 1 | WVTR | 0.008 max. |
| 2 | GTR | 5.0 Min. |
| 3 | Transmittance | No specific requirement. |
| 4 | Temperature | 40° C. max. | f. Determination of Packaging Mode
  Based on the machine availability and convenience and productivity, packaging mode selected is Blister packaging.
g. Determination of Packaging Material
  Material form: Film because packaging mode is blister packaging
  Thickness requirement : 250 to 300 microns Functional Properties

| SR NO | PROPERTIES | UNIT | |
|---|---|---|---|
| 10 | WVTR @ 90% Rh, 38° C. | gm/m2/24 hr. | 0.37 |
| 11 | OTR | Cc/m2/2 hr./bar | 70 min. |
| 12 | Light Transmission | % | Not significant |
| 13 | Thermal conductivity | | Poor |

Application Properties

| SR NO | PROPERTIES | UNIT | Values |
|---|---|---|---|
| 1 | Dimensional Stability: | | |
|  | Longitudinal (Shrinkage) | % | −7.00 max. |
|  | Transversal (Stretching) | % | +1 max. |
| 2 | Impact Strength | gm | 200 min |
| 3 | Tensile Strength: | kg/cm | |
|  | Longitudinal | | 400 min |
|  | Transverse | | 400 min. |
| 4 | Elongation at Peak Load | % | |
|  | Longitudinal | | 3.5 min. |
|  | Transverse | | 3.0 min. |
| 5 | Heat seal strength with Aluminium Foil | kg/cm | 0.56 min. |
| 11 | Forming Temperature | ° C. | 90-140 |
| 12 | Toxicity | | Non Toxic |
| 13 | Stretchability | | 10% |

Special requirement: halogen free h. Material Selection for Getting the Required Property Material which satisfies the requirement in film form of the specified thickness condition is selected from polymer data bank.

The polymer Cyclic Olefin Copolymer is the only polymer which satisfies the functional properties. However it does not satisfies certain application properties like heat sealability with lidding aluminum foils and Impact strengths etc. These application properties can be satisfied by polymer Polypropylene, Polyvinyl chloride, PETG etc. However PVC cannot be suitable because it is not halogen free i. Selection of Technically Feasible Material Composition Since no single polymer satisfies all the properties, combination of film needs to be selected. Based on combination properties.

PP/COC/PP AND PETG/COC/PETG combination is selected.

j. Finalization of the Material Composition Based Commercial Aspect

PP/COC/PP Composition is found to be more economical than PETG/COC/PETG and hence PP/COC/PP is selected.

k. Manufacturing of the Optimum Packaging Material

1. The COC polymer in 190 micron is co-extruded on both sides with PP in 30 micron with the help of tie layers to get a total of 150 microns.
2. Blister cavities are formed by thermoforming this film using a flat bed blister packing machine.
3. The product is placed in the cavities by an automatic feeder.
4. The open side is sealed with 25 microns PP lacquered aluminum foil.

EXAMPLE 6

Development of Optimum Packaging Film for Chlorine Water Treatment Tablets a. Evaluation of the Sensitivity of the Product Towards the Environmental Factors:

The product is exposed various environmental conditions and studied its sensitivity towards each factor and derived its sensitivity values.

a. Sensitivity Study Towards Humidity.

The product is exposed to various humidities varying from 10% RH to 90% RH at interval of 15% RH and its physical and chemical changes are obtained were quantitatively analyzed to derive its sensitivity by using the developed logic.

b. Sensitivity Towards Temperature

The product is exposed to various temperatures varying from −20 to 55° C. at 15° C. interval and physico-chemical changes were studied and temperature sensitivity has derived.

c. Sensitivity Towards Light

The product is exposed to UV (up to 500 W-Hr/m2) and 1.5 Million Lux Hrs at regular interval and the physiochemical changes were studied d. Sensitivity Towards Oxygen The product is exposed to in an oxygen chamber and the pressure variance is studied to quantify the oxygen consumption. The physicochemical changes were studied during this process to derive its sensitivity

| | Environmental factor | Sensitivity |
|---|---|---|
| 1 | Humidity | 9.5 |
| 2 | Temperature | 4.6 |
| 3 | UV light | 0.5 |
| 4 | Visible Light | 0.5 |
| 5 | Oxygen | 6.0 | b. Evaluation and Quantification of Sensitivity Related to Inherent Properties

The following inherent properties of the product studied in various climatic conditions and sensitivity is derived based extent of changes happened on these properties.

| | Inherent property | Sensitivity |
|---|---|---|
| 1 | Hygroscopicity | 9.2 |
| 2 | Degradation tendency | 7.67 |
| 3 | Drug release property | 1.75 |
| 4 | Gas liberation tendency | 9.15 |
| 5 | Dimensional | 2.23 | c. Threshold Values of the Sensitivity Parameters from Which the Product Should be Protected for a Predefined Shelf Life:

| | | Threshold Values | | | |
|---|---|---|---|---|---|
| Sr. No. | Climatic Condition | Moisture % (w/w) | Temperature | Gas (cc) | Light |
| 1 | Tropical climatic Zone | 5.54 | 50° C. max. | Gas liberating & Oxygen sensitive | Not significant | d. Determination of the Barrier Requirement of the Package:
Moisture Barrier Requirement:

| Sr. No. | Condition | Threshold Value | Time period | Max. WVTR of the package |
|---|---|---|---|---|
| 1 | Tropical Climatic Condition | 5.34 | 24 months | 0.000009 |

Gas Barrier Requirement:

| Sr. No. | Condition | Threshold Value | Time period | Max. OTR of the package |
|---|---|---|---|---|
| 1 | Tropical Climatic Condition | 1.2 cc | 24 months | 0.0002 |

Light Barrier Requirement:

| Sr. No. | Condition | Sensitivity to UV light | Sensitivity towards Vis Light | Time period | % Transmission |
|---|---|---|---|---|---|
| 1 | Tropical Zone Condition | Low | Low | 24 months | No specific requirement |

Temperature: 45° C. max.

e. Barrier Requirement for the Packaging

| Sr. No. | Parameter | Limit |
|---|---|---|
| 1 | WVTR | 0.000009 max. |
| 2 | OTR | 0.0002 Max. |
| 3 | Transmittance | No specific requirement. |
| 4 | Temperature | 45° C. max. | f. Determination of Packaging Mode

Since the product is chlorine liberating, blister or pouch packing is not suitable which bulges with the chlorine gas liberate. Hence bottle pack having very tough material is suggested.

g. Determination of Packaging Material

Wall Thickness requirement: 2 mm minimum

Functional Properties

| SR NO | PROPERTIES | UNIT | |
|---|---|---|---|
| 10 | WVTR @ 90% Rh, 38° C. | gm/m2/24 hr. | 0.016 max. |
| 11 | OTR | Cc/m2/2 hr./bar | 1.10 max. |
| 12 | Light Transmission | % | Not significant |
| 13 | Thermal conductivity | | Poor |

Application Properties

Suitable for molding. And provides high toughness h. Material Selection for Getting the Required Property Material which satisfies the requirement is glass and ceramic.

k. Finalization of the Material Composition Based Commercial Aspect

Since Glass bottles are universally and economically available glass bottle having 2 mm thickness is selected.

The invention claimed is:

1. A method of making a packaging material having optimum barrier properties for a pharmaceutical product consisting of the steps of:
   (a) determining sensitivity values of the pharmaceutical product for environmental factors consisting of each of humidity, temperature, light and gas;
   (b) after step (a), determining the sensitivity values of the pharmaceutical products towards inherent properties consisting of each of gas liberation tendencies, drug release properties, dimensional properties, hygroscopicity and degradation;
   (c) after step (a) or (b), quantifying each of the sensitivity values for the environmental factors obtained in step (a) and after step (b) quantifying each of the sensitivity values obtained in step (b);
   (d) after step (c), determining threshold values of the sensitivity parameters from which the pharmaceutical product should be protected;
   (e) after step (d), determining, based on the threshold values obtained in step (d), barrier properties of a group of packaging materials consisting of polymers, papers and metal, to determine the optimal thickness of said materials for packaging the pharmaceutical product in a film having at least one layer, said barrier properties consisting of each of water vapor, transmission rate, thermal conductivity, gas transmission rate and percentage light transmittance;
   (f) after step (e), determining optimal physical properties of the packaging material based on properties consisting of each of WVTR, light transmission, gas transmission, thermal conductivity, thickness, dimensional stability, impact strength, tensile strength, elongation at peak load, heat seal strength, forming temperature, toxicity and stretchability;
   (g) after step (f), selecting at least one packaging material and its thickness such that its barrier properties and physical properties satisfy all the determined threshold values of the sensitivity parameters of the pharmaceutical product determined in step (d); and
   (h) after step (g), converting the selected one or more packaging materials into a packaging system defined by at least one layer,
   wherein the thickness of the packaging system is from about 5 to about 1000 microns, but is no thicker than necessary to satisfy all of the determined threshold values of the sensitivity parameters obtained in step (d).

2. The method of claim 1, wherein the packaging system has 1 to 25 layers.

3. The method of claim 1, wherein the packaging materials selected in step (g) are selected from the group consisting of: paper, paper based substrates, polyvinyl chloride, polyvinylidine chloride, polypropylene, cyclic olefin copolymer, aluminum, aluminum based substrates, polyester, polyethylene nitrile, low density polyethylene, high density polyethylene, glycolized polyester, amorphous polyethylene terephthalate, biaxially oriented polypropylene, nylon, polyviscose, polyvinyl acetate; ethylene vinyl acetate, acrylic, textile fibrous material, polyacrylonitrile, polyethylene terephthalate, polychloro triflouro ethylene, co polyol polymer, cellophane, polycarbonate, linear low density polyethylene and polyvinyl alcohol.

* * * * *